United States Patent
Holzapfel et al.

(10) Patent No.: US 9,780,513 B2
(45) Date of Patent: Oct. 3, 2017

(54) SLIP RING ASSEMBLY AND COMPONENTS THEREOF

(71) Applicant: Schleifring und Apparatebau GmbH, Fürstenfeldbruck (DE)

(72) Inventors: Christian Holzapfel, Fürstenfeldbruck (DE); Norica Godja, Wiener Neustadt (AT)

(73) Assignee: SCHLEIFRING UND APPARATEBAU GMBH, Furstenfeldbruck (DE)

(*) Notice: Subject to any disclaimer, the term of this patent is extended or adjusted under 35 U.S.C. 154(b) by 0 days.

(21) Appl. No.: 15/040,529

(22) Filed: Feb. 10, 2016

(65) Prior Publication Data
US 2016/0172809 A1    Jun. 16, 2016

Related U.S. Application Data

(63) Continuation of application No. PCT/EP2014/067365, filed on Aug. 13, 2014.

(30) Foreign Application Priority Data

Aug. 16, 2013 (EP) .................................... 13180758

(51) Int. Cl.
| | |
|---|---|
| *H01R 39/08* | (2006.01) |
| *H01R 39/02* | (2006.01) |
| *H01R 39/24* | (2006.01) |
| *H01R 43/10* | (2006.01) |
| *H01R 43/12* | (2006.01) |
| *C25D 3/48* | (2006.01) |
| *C25D 7/00* | (2006.01) |

(Continued)

(52) U.S. Cl.
CPC ............. *H01R 39/025* (2013.01); *C25D 3/48* (2013.01); *C25D 7/00* (2013.01); *C25D 15/00* (2013.01); *H01R 39/24* (2013.01); *H01R 39/64* (2013.01); *H01R 43/10* (2013.01); *H01R 43/12* (2013.01); *B82Y 30/00* (2013.01); *H01R 39/085* (2013.01)

(58) Field of Classification Search
CPC ...... H01R 39/08; H01R 39/025; H01R 39/64; H01R 39/10; H02K 13/003; H02K 13/02
See application file for complete search history.

(56) References Cited

U.S. PATENT DOCUMENTS

| | | | |
|---|---|---|---|
| 4,398,113 A | | 8/1983 | Lewis et al. |
| 4,447,752 A | * | 5/1984 | Boyce .................... H01R 39/24 |
| | | | 310/232 |

(Continued)

FOREIGN PATENT DOCUMENTS

| | | |
|---|---|---|
| CA | 2171585 A1 | 12/1996 |
| CN | 1714411 A | 12/2005 |

(Continued)

OTHER PUBLICATIONS

Plasmachem GmbH Article entitled: "Abrasion resistant electroplated Silver through Nanodiamonds—DiamoSilb," (Oct. 16, 2014), www.plasmachem.com.

*Primary Examiner* — Dang Le
(74) *Attorney, Agent, or Firm* — Yakov Sidorin; Quarles & Brady LLP

(57) ABSTRACT

The lifetime of sliding contact surface(s) of a precious metal or a precious metal alloy can be enhanced by embedding at least one nano-particle in the layer forming the sliding contact surface(s).

8 Claims, 3 Drawing Sheets

(51) Int. Cl.
*C25D 15/00* (2006.01)
*H01R 39/64* (2006.01)
*B82Y 30/00* (2011.01)

(56) References Cited

U.S. PATENT DOCUMENTS

| | | | |
|---|---|---|---|
| 6,034,531 A | 3/2000 | Senglat et al. | |
| 7,202,586 B2 * | 4/2007 | Okubo | B82Y 10/00 |
| | | | 310/253 |
| 2001/0033117 A1 * | 10/2001 | Vesper | H01R 39/085 |
| | | | 310/232 |
| 2004/0000834 A1 | 1/2004 | Okubo et al. | |
| 2004/0169434 A1 | 9/2004 | Washington et al. | |
| 2007/0145853 A1 * | 6/2007 | Lee | H01R 13/2421 |
| | | | 310/248 |
| 2009/0058219 A1 * | 3/2009 | Gehlert | H01R 39/025 |
| | | | 310/232 |
| 2010/0033117 A1 | 2/2010 | Chang | |

FOREIGN PATENT DOCUMENTS

| | | |
|---|---|---|
| CN | 1868096 A | 11/2006 |
| CN | 1988290 A | 6/2007 |
| CN | 101278449 A | 10/2008 |
| DE | 10201105804 A1 | 1/2013 |
| EP | 054380 A2 | 6/1982 |
| WO | 2005038985 | 4/2005 |
| WO | 20130007458 | 1/2013 |

* cited by examiner

SLIP RING ASSEMBLY AND COMPONENTS THEREOF

CROSS-REFERENCE TO RELATED APPLICATIONS

This application is a continuation of International Patent Application No. PCT/EP2014/067365 filed on Aug. 13, 2014 and titled "Slip Ring Assembly and Components Thereof", which designates the United States and claims priority from the European Patent Application No. 13180758.8 filed on Aug. 16, 2013. The disclosure of each of the above-identified patent applications is incorporated herein by reference.

BACKGROUND

1. Field of the Invention

The invention relates to electrical sliding contacts. A sliding contact is provided between a metallic, e.g. golden sliding track being electrically contacted by a brush, for example a metallic wire, the latter being positioned to slide over the sliding track, if the sliding track and/or the brush are moved relative to each other. Sliding contacts allow for electrical transmission of data and/or energy between the sliding track and the brush, where the brush and the track may be moved relative to each other. For example, the sliding track may be a ring or a ring segment and may be driven to rotate about its center axis. A brush and ring combination is a slip ring assembly.

2. Description of Relevant Art

Sliding contacts are particularly useful in slip ring assemblies. In this case the sliding track is a ring or ring segment like and thus referred to as slip ring. The slip ring may rotate relative to the brush. The brush may be static relative to a given coordinate system. Alternatively the sliding track, i.e. the slip ring may be static and the brush be moved relative to the given coordinate system. The third alternative is that the brush and the slipring move relative to a given coordinate system. Often slip rings have a contact surface made of a precious metal like gold (Au) or silver (Ag) to provide a sliding contact with a low resistance. However, pure Au is supple and thus worn off quickly if contacted in particular by non Au metallic wires as brush.

U.S. Pat. No. 4,398,113 suggests to contact an Au-sliding track with a brush having a higher resistance against abrasion than the Au-sliding track. In an initial run-in period, Au from the sliding track attaches to the brush, yielding a long lasting brush and a reduced friction between the sliding track and the brush.

WO 2013/007458 A2 discloses a slip ring assembly with a sliding track for being contacted by a brush. The sliding track is a double layer sliding track with a first layer having a higher resistance against abrasion than the Au-layer on top of the first layer. The material of the brush is chosen to have a resistance against abrasion between the resistance against abrasion of the first layer and the resistance against abrasion of the Au-layer. Thereby, first the first Au-layer is worn of and subsequently the brush, which is easy to detect. The first layer is harder, i.e. has a higher rigidity than the Au-layer. This enhances the life time of the Au-layer.

WO 2005/038985 relates to an electrical contact element having a contact layer. Said contact layer comprises a film of an amorphous carbide or nitride with the composition $M_{n+1}AX_n$ where n is a positive integer; M one of Scandium, Titanium, Vandum, Chromium, Zirconium, Niobium, Molybdenum, Hafnium or Tantalum; A one of Aluminum, Silicon, Phospor, Sulfur, Gallium, Germanium, Arsenic Cadmium, Indium, Tin, Thallium or Lead and X is Carbon, Nitrogen or both. The layer has amorphous regions of said $M_{n+1}AX_n$ mixed with regions of said material in a nano-crystal state, This layer is supposed to have a low frictional coefficient and is thus wear resistant.

U.S. 2004/0000834 A1 relates to a commutator with commutator sliding members. The sliding members comprise a layer consisting of graphite, metal powders, binder, a solid lubricant and carbon nano tubes or carbon nano fibers. The components are mixed, molded and baked.

SUMMARY

The problem to be solved is to provide a sliding track or a brush with a high durability and a low contact resistance.

An embodiment of the invention is a sliding track with a top layer for being contacted by at least one brush. The sliding track may comprise a top layer mainly made of a precious metal like Gold (Au) or Silver (Ag). The top layer may comprise alloying components like Copper (Cu), Cobalt (Co) or the like to enhance the hardness and resistance against abrasion of the top layer. In addition, the alloying components may facilitate depositing the top layer by electrolytic deposition. The top layer may be applied as well to a brush for contacting a sliding track, e.g. prior art sliding track or a sliding track with the top layer disclosed in this application.

Preferably, nano-particles (at least one) are embedded in the top layer. Nano-particles are defined by ISO/TS27687:2008 as particles with a diameter smaller than 100 nm. The nano-particles can thus be embedded in the top layer, e.g. of Au or Ag or another precious metal. By the incorporation of the nano-particles dispersion hardening may be obtained.

For example nano-particles of hard materials, like for example Carbides like Silicium Carbide (SiC) and/or Tungsten Carbide (WC) and/or Titanium Carbide (TiC) and/or Boron Carbide ($B_4C$) and/or Tantalum Carbide (TaC) and/or Beryllium Carbide ($Be_2C$) may be incorporated or in other words embedded in the top layer of the sliding track. Nitrides, as in particular Titanium Nitride (TiN) and/or Tantalum (TaN) and/or cubic Boron Nitride (BN) and/or Silicon Nitride ($Si_3N_4$) and/or Aluminum Nitride (AlN) may as well be embedded. As well one may embed nano-particles of Diamond, Aluminum Oxide ($Al_2O_3$), Corundum, sapphire, Rubin, Zircon, Silicon Dioxide ($SiO_2$), Carbon Nano tubes (CNT), Titanium Diboride ($TiB_2$) and/or Molybdenum Disilicate ($MoSi_2$) or the like in the top layer. The nano-particles may as well comprise mixed crystals like TiC—WC and/or TiC—TaC—WC and/or TiC—TiN, which are as well known for their high rigidity and good thermal and electrical conductivity. Multi- and Complexcarbides like in particular $Co_3W_3C$, $Ni_3W_3C$ may as well be comprised in the nano-particles as intermetallic compounds like W—Co and or W—Os and/or W—Re and/or W—Ir and/or Mo—Be.

Nano-particles of Sintered Ceramic Metals (briefly "Cermets") are as well suited. Possible compositions include in particular the following Cermets: Al2O3—Cr; $Al_2O_3$—Mo—Cr; $Al_2O_3$—Ni; $UO_2$—Mo; ZrO2—Mo and/or Titancarbid (TiC)/Titannitrid (TiN)—Ni.

Nano-particles of all these materials are hard and thus have in common a high resistance against abrasion. Thereby, wear of the top layer is reduced without significantly decreasing the contact resistance. In other words the life cycle of the top layer is enhanced. It is believed that the experimentally observed hardening of the Au-layer is due to dispersion hardening. One might expect, that the hard nano-particles could have a negative impact on the life cycle of the brush, however, astonishingly it turned out not to be the case. In a first phase abrasion of Au wire brushes seems to be enhanced, however, after a so called running in phase the abrasion of the Au wire is reduced. It is believed, that during the running in phase supple Au from the wire so to speak soils or smears out on the top layer and thereby reduces the top layer's roughness. This effect is rather surprising, because the hard nano-particles enhance the roughness of the sliding track and have the same effect as corundum on emery paper, i.e. one would expect the hard tips of the nano-particles to grind the brush wire until it fails. But the grinding process suddenly stops after a running in phase.

Hardness is to be understood as indentation hardness that can be measured e.g. by Rockwell hardware testers and correlates linearly with the tensile strength of a material.

Alternatively or additionally one may embed nano-particles made of Graphite and/or Boron Nitride (BN) and/or Molybdenum Disulphide ($MoS_2$) and/or Polytetrafluoroethylene (PTFE). These materials reduce the friction between the top layer of the sliding track and the brush. In addition wear is reduced.

A brush for contacting a sliding track, in particular a sliding track with embedded nano-particles as explained above may comprise at least one metallic wire. Preferably the wire is of a precious metal and/or has at least one a precious metal coating, e.g. a Au or Silver coating to provide a low resistance contacting surface, nano-particles, in particular those of the materials listed above may be embedded in the coating. The wire and/or the coating may comprise alloying components like Copper (Cu), Cobalt (Co) or the like to enhance the hardness and resistance against abrasion of the brushes contacting surface.

Embedding nano-particles, e.g. of the above named materials in the top layer can be obtained by electroplating the top layer in presence of dispersed nano-particles. Accordingly, a method for providing a metal layer of a sliding track and/or a brush which embeds nano-particles comprises at least:

Preparing an electrolyte bath in which nano-particles are dispersed,

Galvanic deposition, i.e. electroplating of a metal layer preferably as top layer on a sliding track blank or a brush blank in said electrolyte bath. The metal layer is preferably of a precious metal or an alloy comprising a precious metal, like Au or Ag.

When electroplating the sliding track blank, the dispersed nano-particles deposit on the sliding track blank and incorporate, i.e. are embedded, in the deposited top layer of the sliding track.

A sliding track blank is a substrate onto which the top layer of the later sliding track can be deposited. In the simplest form the blank can comprise a metallic layer on a PCB-carrier being suited for depositing the later top layer metal, e.g. Au or an Au alloy or a different precious metal or alloy. A ring like sliding track blank is a slip ring blank.

In case of a slip ring, manufacturing is often more complex, but in any cases the later top layer, is deposited on a conducting blank, i.e. sliding track blank or a slip ring blank. For example, the top layer may be deposited on the inner surface of a metal ring. The ring may be filled with a resin or any other plastic material. After curing of the plastic material, the metal ring may be removed e.g. using a lathe until the previously deposited top layer can be contacted by a brush.

If the sliding track blank is a slip-ring blank, the slip ring blank is preferably rotated in the electrolyte bath, to thereby obtain a very homogeneous deposition of the metal and a homogenous nano-particle distribution in the deposited metal layer.

The rotating slip ring blanks are not necessarily fully below the fluid level of the electroyte bath. In this case only a ring segment of the slip ring blank immerses into an electrolyte bath. This enables to apply the top layer to even large diameter slip ring banks without the need for huge electrolyte baths and large amounts of electrolytes.

The electrolyte bath is preferably agitated. Thereby, the nano-particles can be kept dispersed.

For dispersing the nano-particles the bath can be agitated using ultrasonic waves.

The method is explained above with respect to providing a sliding track with a preferably precious metal top layer into which nano-particles have been embedded. The method can as well be used to provide a brush for contacting a sliding track, e.g. by electroplating a wire for use as brush.

A sliding track with a top layer in which nano-particles are embedded can be combined with a prior art brush as well as with a brush having a metal coating in which nano-particles are embedded as well. The brush having a metal coating with embedded nano-particles can be combined with a prior art sliding track as well as with a sliding track as disclosed herein. The combinations each form a slip ring assembly, if the sliding track is ring like.

Example Coatings:

1. A commercially available electrolyte concentrate for hard Au-coating is diluted according to the suppliers specification. Preferably, a surface wetting agent is added as well. The pH is set to 2.8 to 4.6 more preferably to 4.1 to 4.3 using e.g. potassium hydroxide solution and/or an acid like citric acid. About 120 g of SiC-nanoparticies (e.g. with a $d_{50}$ of 20 nm are dispersed in the electrolyte solution using an ultrasonic bath for e.g. 1 h, preferably just before electroplating. Alternatively Carbon-Nano Tubes and/or at least one nano-particle(s) of at least one of the above named materials can be dispersed as well, e.g. Diamond nano-particles and WC can dispersed as well. The obtained electrolyte solution can be used as electrolyte bath for electroplating Au with embedded SiC nano-particles. In said electrolyte bath a sliding track of slip ring was coated with an Au-layer incorporating the SiC nano-particles. The sliding track with a surface of about 2,254 $dm^2$ being positioned fully in the electrolyte bath and was used as cathode. The sliding track was fully immersed in the electrolyte bath and rotated (about 400 rpm ±50%, preferably ±25%, more preferably ±10%). Additionally the electrolyte bath may be stirred using a magnetic stirrer. A Pt-wire grid may be used as Anode. DC currents (e.g. between 0.2 and 10 $A/dm^2$, preferably between 1 and 8 $A/dm^2$, more preferably between 2 and 6$A/dm^2$) were successfully applied. Alternatively plating was obtained using a pulsed current, e.g. using a rectangular pulse with $t_{on}$=100 ms (±25%, preferably ±15%, more preferably ±7.5%) and $t_{off}$=1000 ms (±25%, preferably ±15%, more preferably ±7.5%), Mean current densities have been varied between about 0.5 $A/dm^2$ (±50%, preferably ±25%, more preferably ±10%) and 20 $A/dm^2$ (±50%, preferably ±25%, more preferably ±10%), preferably between 2 $A/dm^2$ and 17.5 $A/dm^2$ and more preferably between 4S/$dm^2$ and 15 $A/dm^2$ (all current densities ±50%, preferably ±25%, more preferably ±10%).

2. A commercially available electrolyte concentrate for hard Au—is diluted according to the suppliers specification. The pH is set to 7.0 to 7.8, preferably to 7.0 to 7.3 at 57° C. (±10° C.), using a base, e.g. potassium hydroxide solution, and/or an acid like citric acid, sulphuric acid and/or nitric acid or the like. About 120g (60 g to 180 g, preferably 90 to 150 g) of SIC-nanoparticies e.g. with a d50 of 20 nm) are dispersed in the electrolyte solution using an ultrasonic bath for e.g. 1 h (±30 min), preferably just before electroplating. Other nano-particles e.g. of Diamond and WC can dispersed as well. The obtained electrolyte solution can be used as electrolyte bath for electroplating Au with embedded SiC nano-particles using DC or pulsed current electroplating as in example 1.

It should be noted that the term "at least one nano-particle" means one or more nano-particles. In practice one will mostly embed a larger amount of nano-particles in the precious metal layer, but the technical effect can be obtained already with very few and theoretically with a single nano-particle in the top layer. Only for convenience in this application mostly the plural "nano-particles" is used, but this should of course cover as well the case of only a single nano-particle in the top layer.

It should be further noted that the term precious metal encompasses any metal of the list rubidium, rhodium, palladium, silver, osmium, iridium, platinum, gold and lead. The non stable precious metals are not relevant for forming a top layer of a sliding track or a brush, but in principle could be used as well. The precious metals of the top layer are typically crystalline, i.e. not amorph.

BRIEF DESCRIPTION OF THE DRAWINGS

In the following, the invention will be described by way of example, without limitation of the general inventive concept, on examples of embodiment and with reference to the drawings.

Figure 1:
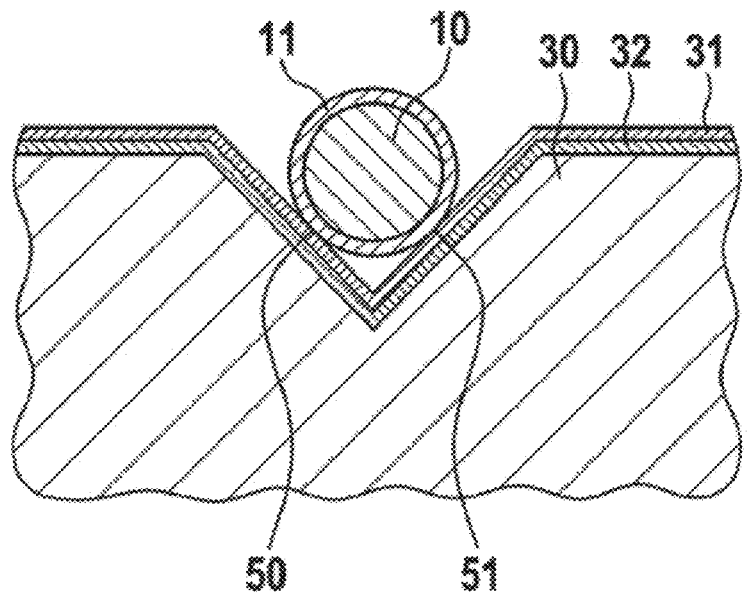
FIG. 1 shows a cross section of a first sliding track brush assembly.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives failing within the spirit and scope of the present invention as defined by the appended claims.

DETAILED DESCRIPTION

FIG. 1 shows sliding contacts 50, 51 between a brush 10 and a sliding track. The sliding track has a support 30, with a first layer e.g. of Ni (Nickel) as mechanical support and diffusion barrier. On top of the first layer 32 is a top layer 31. The latter is electrically contacted by the brush 10. The brush 10 is preferably. In the example, the brush may be a wire 10, preferably a wire 10 with a precious metal coating 11, e.g. a gold (Au) coating. The brush may be positioned in a groove of the sliding track that on the one hand guides the brush 10 and on the other hand doubles the area where the sliding contact 50, 51 between the brush 10 and the sliding track is established. In the example of FIG. 1 the grove has a triangular cross section. However, other cross sections are as well possible.

Figure 2:
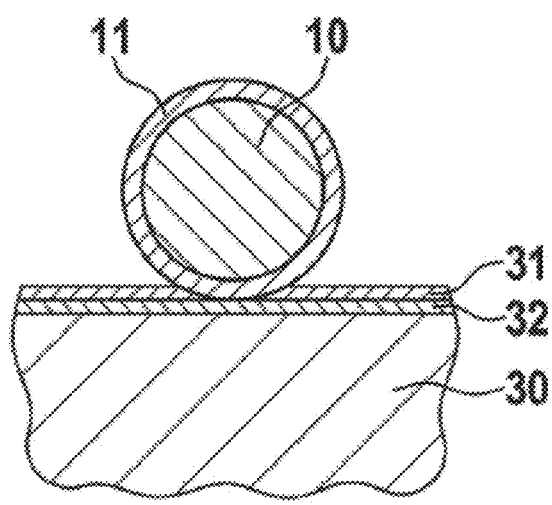
FIG. 2 shows a cross section of a second sliding track brush assembly.

In the examples of FIGS. 1 and 2, the brush is a single wire brush. Alternatively the brush may be for example a multi wire brush 10 or multi filament brush.

An alternative to the grooved sliding track is depicted in FIG. 2: The sliding track of FIG. 2 has an at least essentially plane cross section. This is the only difference to the sliding track of FIG. 1.

Figure 3:
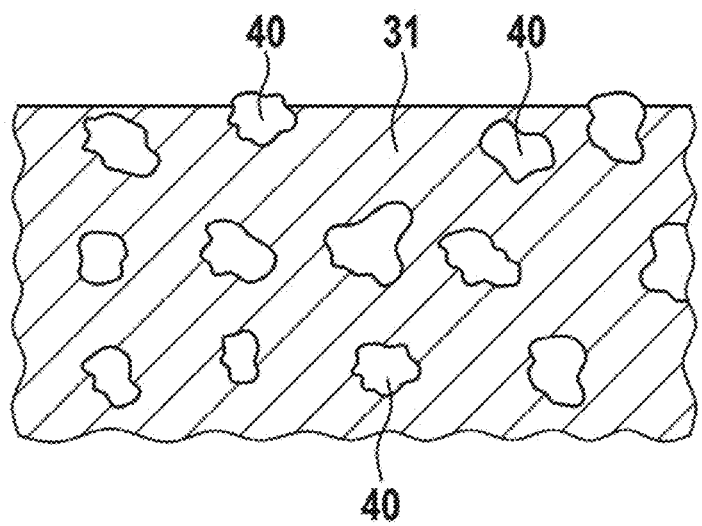
FIG. 3 shows a detail of a top layer as in FIG. 1 and FIG. 2

A detail of the top layer 31 as shown in FIG. 1 and FIG. 2 is shown in FIG. 3. As can be seen SiC nano-particles are embedded randomly distributed in the top layer.

Figure 4:
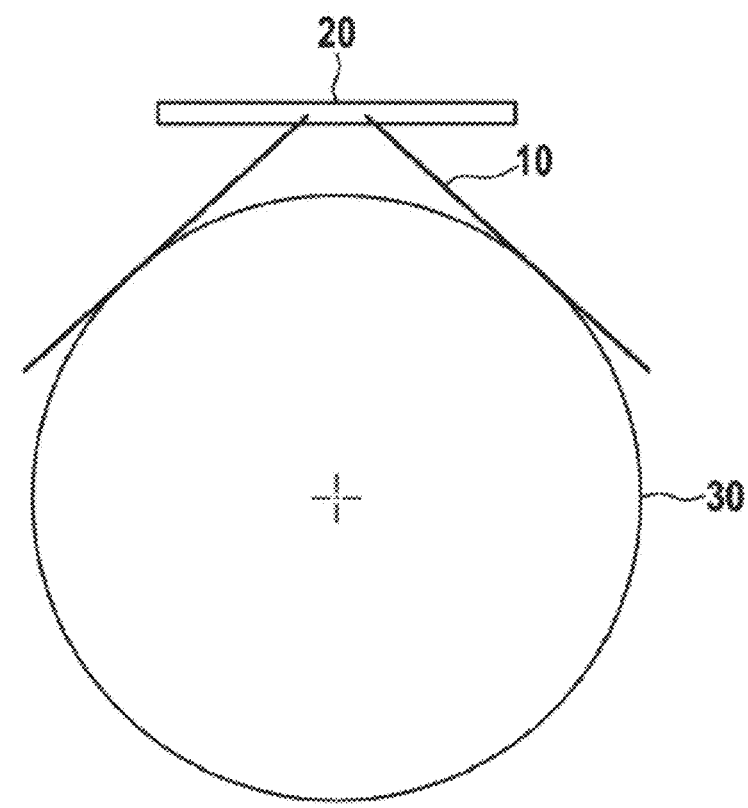
FIG. 4 shows an example for a slip ring assembly

An application of the sliding track assemblies of FIGS. 1 and 2 is shown in FIG. 4: The sliding track 30 has a ring-like or cylindrical side view and is contacted by brushes 10. Only for simplicity, the first layer 32 and the top layer 31 are not shown.

The top layer 31 and as well the coating 11 of the brushes 10 in FIG. 1 and FIG. 2 was applied using electroplating. Electroplating was performed using an electrolyte solution with dispersed nano-particles, e.g. Carbon-Nano Tubes.

Figure 5:
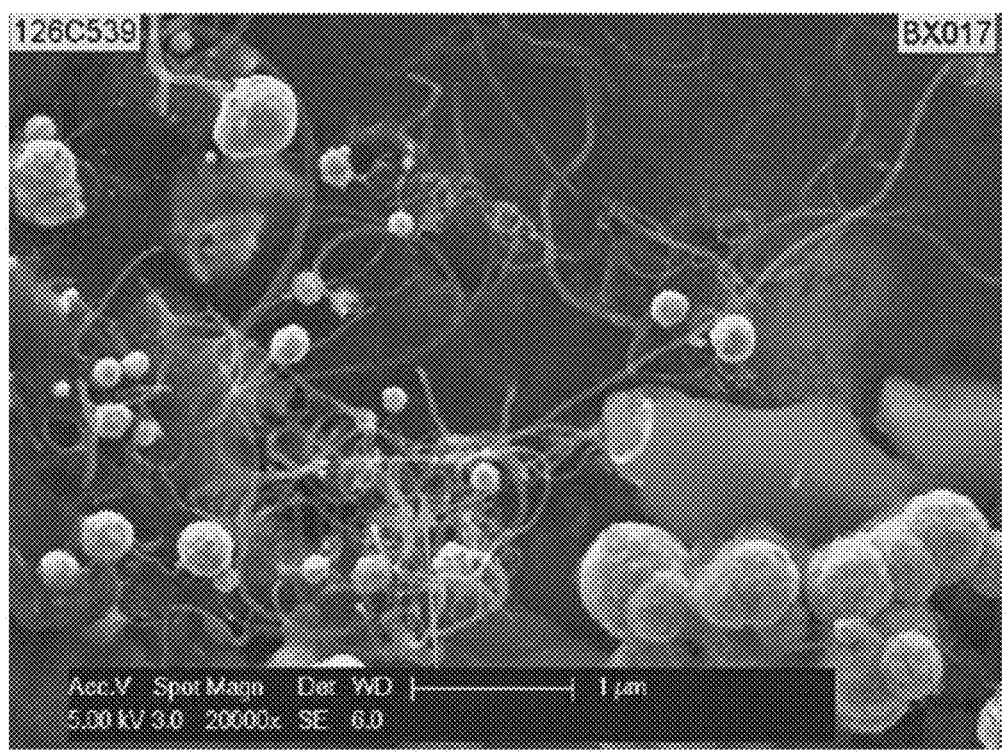
FIG. 5 shows an example Au sliding track with embedded Carbon Nano tubes in 200.000 magnification.

FIG. 5 is shows an Au-surface of a top layer 31 into which carbon nano tubes are embedded in about 20.000 magnification (STM-picture). The surface has been prepared as explained in Example 1, but using Carbon-Nano Tubes instead of SiC and a DC-current of about 2 $A/dm^2$ for deposition. The Carbon-Nano Tubes appear as thin lines. The arrow points to an agglomerate of Carbon-Nano Tubes.

It will be appreciated to those skilled in the art having the benefit of this disclosure that this invention is believed to provide a sliding track, a slip ring with the sliding track and a method for manufacturing a sliding track. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

10 brush/wire of brush
11 precious metal coating of wire 10
20 brush holder
30 support
31 top layer of a precious metal, e.g. Au
32 first layer, preferably of a metal harder than Au, e.g. Ni
40 nano-particles, e.g. SiC
50 sliding contact
51 sliding contact

What is claimed is:

1. A top layer of a sliding track of a slip ring assembly, the top layer including at least one stable precious metal and configured to electrically contact a brush of the slip ring assembly to provide at least one sliding contact between the top layer and the brush,
   wherein nano-particles having at least one of first and second characteristics are embedded in the top layer, wherein the first characteristic includes a resistance against abrasion that is higher than a resistance against abrasion of the at least one stable precious metal,
   wherein the second characteristic includes a frictional coefficient that is lower than a frictional coefficient of said at least one stable precious metal.

2. The top layer of claim 1, wherein the at least one stable precious metal includes at least one of gold (AU) and silver (Ag).

3. The top layer of claim 1, wherein at least one of said nano-particles is selected from a group consisting of SiC, Ti, MO, W, WC, Diamond, PTFE, CNT, Graphite, Graphene, Corundum, Al2O3, sintered ceramic metals, B4C, TaC, Be2C, TiN, TaN, BN, Si3N4, AlN, Rubin, Zircon, TiB2, MoSi2, TiC—WC, TiC—TaC—WC, TiC—TiN, Co3W3C, Ni3W3C, W—Co, W—Os, W—Re, W—Ir, Mo—Be, Al2O3-Cr; Al2O3-Mo—Cr; Al2O3-Ni; UO2-Mo; ZrO2-Mo and Titancarbid (TiC)/ Titannitrid (TiN)—Ni.

4. A top layer of a brush of a slip ring assembly, said top layer including at least one stable precious metal and configured to electrically contact a slip ring of said assembly to provide at least one sliding contact between the top layer and the slip ring,
   wherein nano-particles having at least one of first and second characteristics are embedded in the top layer, wherein the first characteristic includes a resistance against abrasion that is higher than a resistance against abrasion of the at least one stable precious metal,
   wherein the second characteristic includes a frictional coefficient that is lower than a frictional coefficient of said at least one stable precious metal.

5. The top layer of claim 4, wherein at least one of said nano-particles is selected from a group consisting of SiC, Ti, MO, W, WC, Diamond, PTFE, CNT, Graphite, Graphene, Corundum, Al2O3, sintered ceramic metals, B4C, TaC, Be2C, TiN, TaN, BN, Si3N4, AlN, Rubin, Zircon, TiB2, MoSi2, TiC—WC, TiC—TaC—WC, TiC—TiN, Co3W3C, Ni3W3C, W—Co, W—Os, W—Re, W—Ir, Mo—Be, Al2O3-Cr; Al2O3-Mo—Cr; Al2O3-Ni; UO2-Mo; ZrO2-Mo and Titancarhid (TiC)/ Titannitrid (TiN)—Ni.

6. A slip ring assembly with at least one brush and at least one sliding, track, wherein the at least one brush and the at least one sliding track are movably supported relative to each other and in electric contact which each other, wherein at least one of following conditions is satisfied:
   (i) said at least one sliding track has a first top layer that includes at least one stable precious metal and is in contact with the at least one brush, said first top layer having embedded therein nano-particles with at least one of first and second characteristics, wherein the first characteristic includes a resistance against abrasion that is higher than a resistance against abrasion of the at least one stable precious metal, wherein the second characteristic includes a frictional coefficient that is lower than a frictional coefficient of said at least one stable precious metal; and
   (ii) said at least one brush has a second top layer that includes the at least one stable precious metal and is in contact with the at least one sliding track, said second top layer having embedded therein nano-particles with the at least one of said first and second characteristics.

7. A slip ring assembly of claim 6, wherein the at least one stable precious metal includes at least one of gold (AU) and silver (Ag).

8. The slip ring assembly of claim 6, wherein at least one of said nano-particles is selected from a group consisting of SiC, Ti, MO, W, WC, Diamond, PTFE, CNT, Graphite, Graphene, Corundum, Al2O3, sintered ceramic metals, B4C, TaC, Be2C, TiN, TaN, BN, Si3N4, AlN, Rubin, Zircon, TiB2, MoSi2, TiC—WC, TiC—TaC—WC, TiC—TiN, Co3W3C, Ni3W3C, W—Co, W—Os, W—Re, W—Ir, Mo—Be, Al2O3-Cr; Al2O3-Mo—Cr; Al2O3-Ni; UO2-Mo; ZrO2-Mo and Titancasbid (TiC)/Titannitrid (TiN)—Ni.

* * * * *